April 28, 1925.
S. W. PERKINS
TELEGRAPH SYSTEM
Filed May 21, 1921
1,535,627
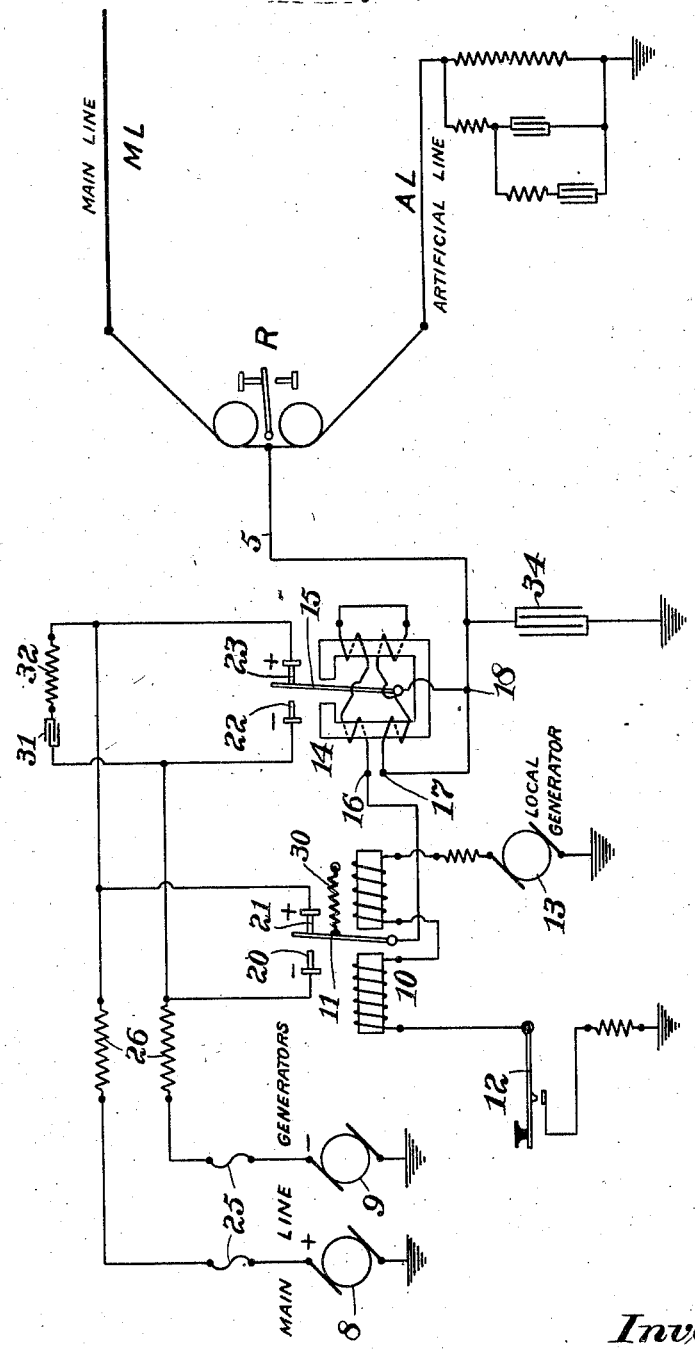
Inventor:
S. W. Perkins,
by Eugene C. Brown
Atty.

Patented Apr. 28, 1925.

1,535,627

UNITED STATES PATENT OFFICE.

SAMUEL W. PERKINS, OF JACKSONVILLE, FLORIDA, ASSIGNOR TO THE WESTERN UNION TELEGRAPH COMPANY, OF NEW YORK, N. Y., A CORPORATION OF NEW YORK.

TELEGRAPH SYSTEM.

Application filed May 21, 1921. Serial No. 471,419.

*To all whom it may concern:*

Be it known that I, SAMUEL W. PERKINS, a citizen of the United States, residing at Jacksonville, in the county of Duval and State of Florida, have invented certain new and useful Improvements in Telegraph Systems, of which the following is a specification.

This invention relates to apparatus and circuits of telegraph systems and more particularly to transmitter systems adapted for duplex and quadruplex telegraphy.

The main object of the invention is to provide a transmitting system which shall preserve the continuity of the main line circuit during changes in polarity and wherein sparking at the contacts of the polechanging devices is practically negligible, thereby permitting the employment of power driven generators as the source of current supply.

In the early days of duplex and quadruplex telegraphy, a gravity battery constituted the source of current and was assigned exclusively to one duplex instrument set or quadruplex instrument set, and it was the general practice to employ a polechanger of the continuity-preserving type known as the "gravity battery polechanger." The reversal of current by means of this instrument caused a momentary short-circuiting of the battery, but the duration of contact was short and the sparking at the contacts was not objectionable.

In more recent practice, higher voltages are employed and power driven generators or dynamos are used as the sources of current, one generator being employed to supply the positive current and another to supply the negative current to a number of duplex or quadruplex sets. Attempts to use a gravity battery polechanger or similar continuity-preserving instrument on duplex or quadruplex sets supplied with current from power-driven generators have been unsuccessful owing chiefly to the very serious arcing which occurs at the contact points when breaking the momentary connection between the positive and negative generators, the voltage at that instant being double the value applied to the circuit in sending any signal. Accordingly, in modern installations wherein two generators are employed as the sources of current, polechanger transmitters have been utilized which interrupt the circuit for an instant during the reversal of polarity. While in many respects polechangers of this type are quite satisfactory, yet they are open to the objection that during the instant the circuit is interrupted between the receiving instruments and the ground via the transmitting equipment, the resistance from line to ground of the entire duplex or quadruplex set is thereby increased and thus tends to cause a corresponding disturbance of the balance between the main and artificial lines of the instrument set at the distant end.

The present invention overcomes the difficulties heretofore encountered as above outlined, obtaining the advantages of a continuity-preserving polechanger by combining with the more common type of polechanger a polarized relay which is herein termed a "sub-polechanger."

In the accompanying drawing, the figure illustrates diagrammatically a transmitting system or equipment suitable for transmission of telegraphic signals in accordance with the features of this invention, only so much of a telegraph system being shown as will be necessary to a clear understanding thereof.

In said drawing R represents the relay of a duplex receiving set bridged between the main line ML and artificial line AL, its neutral point being connected to the conductor 5 of the transmitting apparatus. The main line generators 8 and 9 are positively and negatively poled respectively and grounded. The local circuit contains the ordinary polechanger 10, which constitutes the controlling relay, a transmitting key 12 and a current source 13. The "sub-polechanger" 14 is of a non-biased type, that is, its armature 15 will remain in the position to which it may have been moved by an impulse of current until an impulse of current in the opposite direction through the windings of the relay, biases the armature to the other side. Its windings are in series, one terminal 16 being connected to armature 11 of polechanger 10 and the other terminal 17 being connected to the outgoing conductor 5 and also to the armature 15 at point 18. The contacts of the polechanger and sub-polechanger are connected in parallel to the main line generator, contacts 20 and 22 being connected to the negative poled generator and contacts 21 and 23 to the positive poled generator. The leads from the generators may be provided with fuses or thermal cut-outs 25 and preferably include resistances 26, of approximately two ohms per volt.

The operation of the transmitting apparatus will be evident to engineers from the above detailed description of the several elements. During the transmission of a spacing signal, the operator's key 12 is open and the armature 11 remains on its positive contact stop 21, against which it is biased by the spring 30. The armature 15 of the sub-polechanger also remains on its positive contact stop 23. The positive generator 8 is thus connected directly to line through the armature 15, while the windings of the sub-polechanger 14 are short-circuited through the two armatures. Upon closing the key to send a marking signal or impulse, the polechanger armature 11 will leave its contact stop 21 and travel toward contact stop 20. During the time occupied by such travel, no change takes place at the sub-polechanger and therefore, the positive generator remains connected toward the line. When the polechanger armature 11 reaches its contact stop 20, the generators 8 and 9 are connected together through the windings of the sub-polechanger and the two armatures 11 and 15, and both are connected to the line at the point 18. At this moment the current from both generators flowing through the windings of the sub-polechanger in the direction from 18 to 16 is quite high and the resulting magnetomotive force impels the armature 15 to move with great rapidity from contact 23 to contact 22. As the armature leaves its contact 23, the negative generator alone is connected toward the line through the armature 11 of the polechanger 10 and the windings of the sub-polechanger 14, which reduces the current flowing through the windings, but does not change its direction. When the armature 15 reaches its contact stop 22, the sub-polechanger windings are short-circuited through the two armatures and a direct connection is established from the negative generator 9 to the line through armature 15.

When the operator's key 12 is again opened to cause the transmission of a spacing signal, the magnet of the controlling polechanger 10 will be deenergized, and the armature 11 will be retracted by spring 30 from contact 20 toward contact 21. During its travel no change will occur at the sub-polechanger. As the armature 11 engages contact stop 21, the generators 8 and 9 are connected together through the two armatures and the windings of the sub-polechanger and toward the main line at point 18. A heavy current therefore flows through the sub-polechanger windings in the direction from 16 to 18, resulting in a strong pull on the armature 15, which causes it to move very rapidly from contact 22 to contact 23. As soon as the armature leaves contact 22, the positive generator alone is connected to line through the polechanger windings, reducing the current flowing through the windings, but making no change in its direction. When the armature 15 reaches contact stop 23, the sub-polechanger windings are again short-circuited through the two armatures and direct connection is established from positive generator 8 to line through armature 15.

The results obtained with this transmission system are very similar to those obtained with a gravity battery continuity-preserving polechanger which has been delicately adjusted for a minimum period of continuity-preserving; that is, the time occupied in reversing the transmitted current is reduced to a minimum and the resistance of the duplex or quadruplex set between its line and ground connections is maintained almost at a uniform value. However, instead of the severe arcing at the contacts which makes it impracticable to employ an instrument of the type of the "gravity battery polechanger" for operation with separate positive and negative generators, the sparking in the present system is so small as to be practically negligible and does not interfere with working. This is probably due to the very high speed at which the sub-polechanger armature leaves its contact stops in response to a reversal of position of the polechanger armature. Any tendency to sparking is absorbed or nullified by the shunt about the contacts containing the condenser 31 and resistance 32, which may conveniently be one-quarter microfarad and twenty ohms respectively. This effect may also be assisted by the condenser shunt 34, which may be of one microfarad capacity.

I have described in detail the particular arrangement shown in the drawings for the purpose of definitely disclosing one embodiment of my invention, but it will be obvious to engineers that various changes may be made and other applications embodying the essential features of my sub-polechanger will readily occur to those familiar with telegraphic apparatus. For instance, a polar relay may be substituted for the neutral controlling relay; other transmitting means may be substituted for the key which controls the relay; other polechanging devices may be used in lieu of the neutral relay and key. While I have illustrated oppositely poled current generators, I may operate the sub-polechanger in association with a single source of current and mechanism for producing the necessary reversals.

I claim:—

1. In a telegraph system, a circuit, a source of current, a polar relay, transmitting mechanism, circuit connections between said relay and said mechanism for controlling the actuation of said relay, said mechanism and said relay operating conjointly to reverse the polarity in said circuit while maintaining the continuity thereof.

2. In a telegraph system, a main circuit, a source of current, a polar relay, a relay for controlling the operation of said polar relay, interconnecting circuits between said relays and means for determining the operation of said controlling relay, said interconnecting circuits being jointly controlled by said relays for reversing the current in said main circuit while maintaining its continuity at all times.

3. In a telegraph transmitting system, a circuit, oppositely poled current sources, a controlling relay, a polar relay, means for alternately energizing and deenergizing said controlling relay, and means jointly controlled by said relays for momentarily connecting said sources in series through the windings of said polar relay so that their voltages add to each other just prior to each reversal of current while maintaining the terminal connection of the circuit unbroken, and for short-circuiting the polar relay windings after each movement of the armature of the polar relay.

4. In a telegraph transmitting system, a line circuit, a source of current, a controlling relay, a polar relay, and means for energizing and deenergizing said controlling relay, corresponding contacts of said relays being connected in parallel to corresponding parts of the line, one terminal of the windings of said polar relay being connected to the armature of said controlling relay, and the other terminal together with the armature of the polar relay being connected to the line.

5. In a telegraph transmitting system, a line circuit, oppositely poled current generators, a controlling relay, a polar relay, circuit connections between the energizing coils of said polar relay and the armature of said controlling relay, means for energizing and deenergizing said controlling relay, and means jointly controlled by said relays for reversing the polarity to line while maintaining the line terminal connections.

6. In a telegraph transmitting system, a line circuit, oppositely poled current generators, a controlling relay, a polar relay, means for energizing and deenergizing said controlling relay, and means jointly controlled by said relays for reversing the polarity to line while maintaining the line terminal connections closed, and for connecting the generators in voltage additive relation through the polar relay windings just prior to current reversal and for short-circuiting said windings immediately after said current reversal.

7. In a telegraph transmitting system, a local circuit comprising a controlling relay, a transmitting device and a current source; a main line, a polar relay having its armature and one terminal of its windings connected to said line, the other terminal being connected to the armature of said controlling relay, and line terminal circuits including oppositely poled current generators and contacts of said controlling and polar relays, the corresponding contacts of said relays being connected in parallel respectively to said line terminal circuits.

In testimony whereof I affix my signature.

SAMUEL W. PERKINS.